(12) United States Patent
Danziger

(10) Patent No.: US 12,535,723 B2
(45) Date of Patent: Jan. 27, 2026

(54) REFLECTIVE SLM IMAGE PROJECTOR WITH INTERMEDIATE IMAGE PLANE

(71) Applicant: Lumus Ltd., Ness Ziona (IL)

(72) Inventor: Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 465 days.

(21) Appl. No.: 18/018,625

(22) PCT Filed: Aug. 30, 2021

(86) PCT No.: PCT/IL2021/051060
§ 371 (c)(1),
(2) Date: Jan. 30, 2023

(87) PCT Pub. No.: WO2022/044019
PCT Pub. Date: Mar. 3, 2022

(65) Prior Publication Data
US 2023/0296968 A1 Sep. 21, 2023

Related U.S. Application Data

(60) Provisional application No. 63/076,971, filed on Sep. 11, 2020, provisional application No. 63/072,174, filed on Aug. 30, 2020.

(51) Int. Cl.
*G03B 21/00* (2006.01)
*G03B 21/14* (2006.01)
*G03B 33/12* (2006.01)

(52) U.S. Cl.
CPC ......... *G03B 21/006* (2013.01); *G03B 21/142* (2013.01); *G03B 33/12* (2013.01)

(58) Field of Classification Search
CPC .... G03B 21/006; G03B 21/008; G03B 21/28; G03B 21/142; G03B 21/208; G03B 21/2053; G03B 21/2073; G03B 33/00; G03B 33/12; G02B 27/01; G02B 27/017; G02B 27/0101
See application file for complete search history.

(56) References Cited

U.S. PATENT DOCUMENTS 2,748,659 A 6/1956 Geffcken et al.
2,795,069 A 6/1957 Hardesty
(Continued)

FOREIGN PATENT DOCUMENTS

JP 2011-028141 2/2011

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.
(Continued)

*Primary Examiner* — Sultan Chowdhury
(74) *Attorney, Agent, or Firm* — Rivka Friedman

(57) ABSTRACT

An image projector includes a spatial light modulator (SLM) (320) illuminated by light from an illumination source (316) so as to reflect light corresponding to an image. A first optical arrangement (322) with positive optical power focuses light reflected from the SLM at an image plane (324). A second optical arrangement (328) with positive optical power collimates light from the image plane (324) as a collimated output image.

8 Claims, 2 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,829,197 A | 8/1974 | Thelen |
| 3,857,109 A | 12/1974 | Pilloff |
| 3,940,204 A | 2/1976 | Withrington |
| 3,969,023 A | 7/1976 | Brandt et al. |
| 4,084,883 A | 4/1978 | Eastman et al. |
| 4,191,446 A | 3/1980 | Arditty et al. |
| 4,309,070 A | 1/1982 | St Leger Searle |
| 4,331,387 A | 5/1982 | Wentz |
| 4,516,828 A | 5/1985 | Steele |
| 4,613,216 A | 9/1986 | Herbec et al. |
| 4,662,717 A | 5/1987 | Yamada et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,619,601 A | 4/1997 | Akashi et al. |
| 5,650,873 A | 7/1997 | Gal et al. |
| 5,680,209 A | 10/1997 | Meinrad |
| 5,712,694 A | 1/1998 | Taira et al. |
| 5,724,163 A | 3/1998 | David |
| 5,745,199 A | 4/1998 | Suzuki et al. |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Yaakov et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,222,676 B1 | 4/2001 | Togino et al. |
| 6,239,092 B1 | 5/2001 | Papasso et al. |
| 6,322,256 B1 | 11/2001 | Inada et al. |
| 6,324,330 B1 | 11/2001 | Stites |
| 6,349,001 B1 | 2/2002 | Spitzer |
| 6,362,861 B1 | 3/2002 | Hertz et al. |
| 6,384,982 B1 | 5/2002 | Spitzer |
| 6,388,814 B2 | 5/2002 | Tanaka |
| 6,404,550 B1 | 6/2002 | Yajima |
| 6,404,947 B1 | 6/2002 | Matsuda |
| 6,424,449 B1 * | 7/2002 | Namiki ............ G02B 27/46 359/247 |
| 6,483,113 B1 | 11/2002 | Sealy et al. |
| 6,509,982 B2 | 1/2003 | Steiner |
| 6,542,307 B2 | 4/2003 | Gleckman |
| 6,556,282 B2 | 4/2003 | Jamieson et al. |
| 6,577,411 B1 | 6/2003 | David |
| 6,671,100 B1 | 12/2003 | McRuer |
| 6,690,513 B2 | 2/2004 | Hulse et al. |
| 6,710,902 B2 | 3/2004 | Takeyama |
| 6,762,801 B2 | 7/2004 | Weiss et al. |
| 6,775,432 B2 | 8/2004 | Basu |
| 6,791,760 B2 | 9/2004 | Janeczko et al. |
| 6,798,579 B2 | 9/2004 | Robinson et al. |
| 6,799,859 B1 | 10/2004 | Ida et al. |
| 6,829,095 B2 | 12/2004 | Amitai |
| 6,880,931 B2 | 4/2005 | Moliton et al. |
| 6,942,925 B1 | 9/2005 | Lazarev et al. |
| 7,016,113 B2 | 3/2006 | Choi et al. |
| 7,021,777 B2 | 4/2006 | Amitai |
| 7,088,664 B2 | 8/2006 | Kim et al. |
| 7,175,304 B2 | 2/2007 | Wadia et al. |
| 7,205,960 B2 | 4/2007 | David |
| 7,339,742 B2 | 3/2008 | Amitai et al. |
| 7,355,795 B1 | 4/2008 | Yamazaki et al. |
| 7,384,159 B2 | 6/2008 | Takeda |
| 7,391,573 B2 | 6/2008 | Amitai |
| 7,418,170 B2 | 8/2008 | Mukawa et al. |
| 7,430,355 B2 | 9/2008 | Heikenfeld et al. |
| 7,448,170 B2 | 11/2008 | Milovan et al. |
| 7,457,040 B2 | 11/2008 | Amitai |
| 7,577,326 B2 | 8/2009 | Amitai |
| 7,612,879 B2 | 11/2009 | Stumpe et al. |
| 7,643,214 B2 | 1/2010 | Amitai |
| 7,672,055 B2 | 3/2010 | Amitai |
| 7,724,443 B2 | 5/2010 | Amitai |
| 7,751,122 B2 | 7/2010 | Amitai |
| 7,778,508 B2 | 8/2010 | Hirayama |
| 7,808,625 B2 | 10/2010 | Nakamura et al. |
| 7,949,214 B2 | 5/2011 | Dejong |
| 7,995,275 B2 | 8/2011 | Maeda et al. |
| 8,000,020 B2 | 8/2011 | Amitai |
| 8,035,872 B2 | 10/2011 | Ouchi |
| 8,098,439 B2 | 1/2012 | Amitai et al. |
| 8,187,481 B1 | 5/2012 | Hobbs |
| 8,405,573 B2 | 3/2013 | Lapidot et al. |
| 8,432,614 B2 | 4/2013 | Amitai |
| 8,433,172 B2 | 4/2013 | Optivent |
| 8,643,948 B2 | 2/2014 | Amitai et al. |
| 8,666,208 B1 | 3/2014 | Amirparviz et al. |
| 8,718,437 B2 | 5/2014 | Coe-Sullivan |
| 8,870,384 B2 | 10/2014 | Imai et al. |
| 8,913,865 B1 | 12/2014 | Bennett |
| 9,025,253 B2 | 5/2015 | Hadad et al. |
| 9,523,852 B1 | 12/2016 | Brown et al. |
| 9,541,762 B2 | 1/2017 | Mukawa et al. |
| 9,551,880 B2 | 1/2017 | Amitai |
| 9,709,809 B2 | 7/2017 | Miyawaki et al. |
| 10,222,535 B2 | 3/2019 | Remhof et al. |
| 10,302,957 B2 | 5/2019 | Sissom |
| 10,437,068 B2 | 10/2019 | Weng |
| 10,466,479 B2 | 11/2019 | Shih et al. |
| 10,571,636 B2 | 2/2020 | Gelberg |
| 10,739,598 B2 | 8/2020 | Ofir |
| 10,809,528 B2 | 10/2020 | Amitai |
| 10,830,938 B2 | 11/2020 | Eisenfeld |
| 10,908,426 B2 | 2/2021 | Amitai |
| 10,951,867 B2 | 3/2021 | Pappas et al. |
| 10,969,590 B1 | 4/2021 | Danziger et al. |
| 11,523,092 B2 | 12/2022 | Greenstein et al. |
| 2001/0000124 A1 | 4/2001 | Joel et al. |
| 2001/0030860 A1 | 10/2001 | Kimura et al. |
| 2002/0015233 A1 | 2/2002 | Park |
| 2002/0097762 A1 | 7/2002 | Yoshimura et al. |
| 2002/0176173 A1 | 11/2002 | Song |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0072160 A1 | 4/2003 | Kuepper et al. |
| 2003/0090439 A1 | 5/2003 | Spitzer et al. |
| 2003/0165017 A1 | 9/2003 | Amitai et al. |
| 2003/0169504 A1 | 9/2003 | Kaminsky et al. |
| 2003/0197938 A1 | 10/2003 | Schmidt et al. |
| 2003/0218718 A1 | 11/2003 | Moliton et al. |
| 2003/0235768 A1 | 12/2003 | Fincher et al. |
| 2004/0013068 A1 | 1/2004 | Kato et al. |
| 2004/0085649 A1 | 5/2004 | Repetto et al. |
| 2004/0137189 A1 | 7/2004 | Tellini et al. |

(56) References Cited

U.S. PATENT DOCUMENTS

| | | |
|---|---|---|
| 2004/0233534 A1 | 11/2004 | Nakanishi et al. |
| 2005/0012842 A1 | 1/2005 | Miyagawa et al. |
| 2005/0018308 A1 | 1/2005 | Cassarly et al. |
| 2005/0024849 A1 | 2/2005 | Parker et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0171046 A1 | 8/2006 | Recco et al. |
| 2006/0268421 A1 | 11/2006 | Shimizu et al. |
| 2007/0035707 A1 | 2/2007 | Margulis |
| 2007/0070859 A1 | 3/2007 | Hirayama |
| 2007/0159673 A1 | 7/2007 | Freeman et al. |
| 2007/0188837 A1 | 8/2007 | Shimizu et al. |
| 2008/0025667 A1 | 1/2008 | Amitai |
| 2008/0094586 A1 | 4/2008 | Hirayama |
| 2008/0151375 A1 | 6/2008 | Lin |
| 2008/0151379 A1 | 6/2008 | Amitai |
| 2008/0192239 A1 | 8/2008 | Otosaka |
| 2008/0198471 A1 | 8/2008 | Amitai |
| 2008/0247150 A1 | 10/2008 | Itoh et al. |
| 2008/0259429 A1 | 10/2008 | Kamm et al. |
| 2008/0278812 A1 | 11/2008 | Amitai |
| 2009/0010023 A1 | 1/2009 | Kanade et al. |
| 2009/0122414 A1 | 5/2009 | Amitai |
| 2009/0190222 A1 | 7/2009 | Simmonds et al. |
| 2010/0053148 A1 | 3/2010 | Khazeni et al. |
| 2010/0067110 A1 | 3/2010 | Yaakov et al. |
| 2010/0111472 A1 | 5/2010 | DeJong |
| 2010/0182571 A1* | 7/2010 | Nishikawa ............ G02B 30/25 353/34 |
| 2010/0201128 A1 | 8/2010 | Saccomammo |
| 2010/0202048 A1 | 8/2010 | Amitai et al. |
| 2010/0202128 A1 | 8/2010 | Saccomanno |
| 2010/0214635 A1 | 8/2010 | Sasaki et al. |
| 2010/0278480 A1 | 11/2010 | Vasylyev et al. |
| 2010/0291489 A1 | 11/2010 | Moskovits et al. |
| 2011/0002019 A1 | 1/2011 | Routley et al. |
| 2011/0037953 A1* | 2/2011 | Nizani ................. G02B 3/005 353/38 |
| 2011/0096566 A1 | 4/2011 | Tsai et al. |
| 2011/0176218 A1 | 7/2011 | Noui |
| 2011/0227661 A1 | 9/2011 | Numata et al. |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0147361 A1 | 6/2012 | Mochizuki et al. |
| 2012/0194781 A1 | 8/2012 | Agurok |
| 2012/0206817 A1 | 8/2012 | Totani et al. |
| 2012/0274751 A1 | 11/2012 | Smith et al. |
| 2012/0306940 A1 | 12/2012 | Machida |
| 2013/0007833 A1 | 1/2013 | Kitazato et al. |
| 2013/0016292 A1 | 1/2013 | Mlao et al. |
| 2013/0022316 A1 | 1/2013 | Pelletier et al. |
| 2013/0027655 A1 | 1/2013 | Blum et al. |
| 2013/0135749 A1 | 5/2013 | Akutsu et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0160577 A1 | 6/2014 | Dominici et al. |
| 2014/0185142 A1 | 7/2014 | Gupta et al. |
| 2014/0204437 A1* | 7/2014 | Ayres ................... G11B 7/1381 359/22 |
| 2014/0226215 A1 | 8/2014 | Komatsu et al. |
| 2014/0226361 A1 | 8/2014 | Vasylyev |
| 2014/0334777 A1 | 11/2014 | Dubroca et al. |
| 2014/0374377 A1 | 12/2014 | Schulz et al. |
| 2015/0016777 A1 | 1/2015 | Abovitz et al. |
| 2015/0081313 A1 | 3/2015 | Boross et al. |
| 2015/0138646 A1 | 5/2015 | Tatsugi |
| 2015/0153569 A1 | 6/2015 | Yonekubo |
| 2015/0160529 A1 | 6/2015 | Popovich et al. |
| 2015/0182348 A1 | 7/2015 | Siegal et al. |
| 2015/0219834 A1 | 8/2015 | Nichol et al. |
| 2015/0219919 A1* | 8/2015 | Ouderkirk ............ G02B 27/285 359/489.09 |
| 2015/0241619 A1 | 8/2015 | Richards et al. |
| 2015/0331546 A1 | 11/2015 | Craven-Bartle et al. |
| 2016/0062119 A1 | 3/2016 | Fitch et al. |
| 2016/0202048 A1 | 7/2016 | Meng |
| 2016/0234485 A1 | 8/2016 | Robbins et al. |
| 2016/0238844 A1 | 8/2016 | Dobschal |
| 2016/0370693 A1 | 12/2016 | Watanabe |
| 2017/0004574 A1 | 1/2017 | Deats et al. |
| 2017/0045743 A1 | 2/2017 | Dobschal et al. |
| 2017/0045744 A1 | 2/2017 | Amitai |
| 2017/0075119 A1 | 3/2017 | Schultz et al. |
| 2017/0097506 A1 | 4/2017 | Schowengerdt et al. |
| 2017/0242249 A1 | 8/2017 | Wall |
| 2017/0285346 A1 | 10/2017 | Pan |
| 2017/0293140 A1 | 10/2017 | Cai et al. |
| 2017/0336636 A1 | 11/2017 | Amitai |
| 2017/0343822 A1 | 11/2017 | Border et al. |
| 2017/0357095 A1 | 12/2017 | Amitai |
| 2017/0357100 A1 | 12/2017 | Ouderkirk et al. |
| 2017/0363799 A1 | 12/2017 | Ofir et al. |
| 2018/0039082 A1 | 2/2018 | Amitai |
| 2018/0067315 A1 | 3/2018 | Amitai et al. |
| 2018/0157057 A1* | 6/2018 | Gelberg ............... G02B 27/283 |
| 2018/0210202 A1 | 7/2018 | Danziger |
| 2018/0267295 A1 | 9/2018 | Dalrymple et al. |
| 2018/0292599 A1 | 10/2018 | Ofir et al. |
| 2018/0335629 A1 | 11/2018 | Cheng et al. |
| 2019/0170327 A1 | 6/2019 | Eisenfeld et al. |
| 2019/0187482 A1 | 6/2019 | Lanman |
| 2019/0212487 A1 | 7/2019 | Danziger |
| 2019/0227215 A1 | 7/2019 | Danziger et al. |
| 2019/0293856 A1 | 9/2019 | Danziger |
| 2019/0377187 A1 | 12/2019 | Rubin et al. |
| 2019/0378044 A1 | 12/2019 | Jeffery et al. |
| 2019/0391408 A1 | 12/2019 | Mansharof |
| 2020/0089001 A1 | 3/2020 | Amitai et al. |
| 2020/0183170 A1 | 6/2020 | Amitai et al. |
| 2020/0192101 A1 | 6/2020 | Ayres et al. |
| 2020/0225484 A1 | 7/2020 | Takagi et al. |
| 2020/0278557 A1 | 9/2020 | Greenstein et al. |
| 2020/0292819 A1 | 9/2020 | Danziger et al. |
| 2020/0360879 A1 | 11/2020 | Arnold et al. |
| 2020/0371311 A1 | 11/2020 | Lobachinsky et al. |
| 2021/0018755 A1 | 1/2021 | Amitai |
| 2021/0033872 A1 | 2/2021 | Rubin et al. |
| 2021/0072553 A1 | 3/2021 | Danziger et al. |
| 2021/0149199 A1 | 5/2021 | Guan et al. |
| 2021/0168352 A1* | 6/2021 | Silverstein ............ G02B 6/353 |
| 2022/0004014 A1 | 1/2022 | Ronen et al. |
| 2022/0030205 A1 | 1/2022 | Danziger |
| 2022/0113549 A1 | 4/2022 | Danziger et al. |
| 2022/0269098 A1 | 8/2022 | Danziger et al. |
| 2022/0342216 A1 | 10/2022 | Danziger et al. |
| 2023/0296899 A1 | 9/2023 | Ronen et al. |

OTHER PUBLICATIONS

Jinying Li et al "Improvement of pointing accuracy for Risley prisms by parameter identification", Sep. 2017Applied Optics 56(26):7358; DOI:10.1364/AO.56.007358.

Klaus Ehrmann et al "Optical power mapping using paraxial laser scanning",Proceedings vol. 7163, Ophthalmic Technologies XIX; 71631E (2009) https://doi.org/10.1117/12.806765 Event: SPIE BiOS, 2009, San Jose, California, United States.

Erhui Qi et al "The Application of Pentaprism Scanning Technology on the Manufacturing of M3MP",Proc. of SPIE vol. 9682 96821A-1 Downloaded From: http://proceedings.spiedigitallibrary.org/ on Dec. 8, 2016 Terms of Use: http://spiedigitallibrary.org/ss/termsofuse.aspx.

Wei Chen et al"An Image Quality Evaluation Method of near-eye display" , First published: May 25, 2016 https://doi.org/10.1002/sdtp.10935.

(56) References Cited

OTHER PUBLICATIONS

Halifoux B.D. et al., "Compensating film stress in thin silicon substrates using ion implantation," Opt. Express 27, 11182-11195 (Jan. 21, 2019) Chalifoux B.D et al. Jan. 21, 2019 (Jan. 21, 2019).

Amotchkina T. et al; "Stress compensation with antireflection coatings for ultrafast laser applications: from theory to practice," Opt. Express 22, 30387-30393 (2014) Amotchkina T. et al. Dec. 31, 2014 (Dec. 31, 2014).

Mori H. et al., "Reflective coatings for the future x-ray mirror substrates", Proc. SPIE 10699, Space Telescopes and Instrumentation 2018: Ultraviolet to Gamma Ray, 1069941 (Jul. 6, 2018); available at URL <http://doi.org/10.1117/12.2313469> Mori H. et al. Jul. 6, 2018 (Jul. 6, 2018).

Chalifoux B.D. et al., "Compensating film stress in thin silicon substrates using ion implantation," Opt. Express 27, 11182-11195 (Jan. 21, 2019) Chalifoux B.D. et al. Jan. 21, 2019 (Jan. 21, 2019).

Petros I. Stavroulakis, Stuart A. Boden, Thomas Johnson, and Darren M. Bagnall, "Suppression of backscattered diffraction from sub-wavelength 'moth-eye' arrays," Opt. Express 21, 1-11 (2013).

Qiaoyin Yang et al. "Antireflection effects at nanostructured material interfaces and the suppression of thin-film interference" 2013 Nanotechnology, vol. 24, No. 23 May 15, 2013.

S. Chattopadhyay et al. "Anti-reflecting and photonic nanostructures," Materials Science and Engineering: R: Reports, vol. 69, Issues 1-3, 2010, pp. 1-35, ISSN 0927-796X, https://doi.org/10.1016/j.mser.2010.04.001.

Salter, P. S. and Booth, M. J. et al. "Designing and aligning optical systems incorporating Liquid crystal spatial light modulators (SLMs)", Department of Engineering, University of Oxford, vr1.0, doi: 10.5281/zenodo.4518992 (published online Feb. 12, 2020) Salter, P. S. and Booth, M. J. Feb. 12, 2020 (Feb. 12, 2020).

R. J. Weiblen, C. R. Menyuk, L. E. Busse, L. B. Shaw, J. S. Sanghera, and I. D. Aggarwal, "Optimized moth-eye anti-reflective structures for As2S3 chalcogenide optical fibers," Opt. Express 24, 10172-10187 (2016).

Qiao, DY., Wang, SJ. & Yuan, WZ. A continuous-membrane micro deformable mirror based on anodic bonding of SOI to glass wafer. Microsyst Technol 16, 1765-1769 (2010). https://doi.org/10.1007/s00542-010-1102-0.

J. Wei, S.M.L. Nai, C.K. Wong, L.C. Lee, "Glass-to-glass anodic bonding process and electrostatic force" Thin Solid Films, vols. 462-463, 2004, pp. 487-491, ISSN 0040-6090, https://doi.org/10.1016/j.tsf.2004.05.067. (https://www.sciencedirect.com/science/article/pii/S0040609004006613).

Second Office Action for CN 202180052817.1.

\* cited by examiner

REFLECTIVE SLM IMAGE PROJECTOR WITH INTERMEDIATE IMAGE PLANE

FIELD AND BACKGROUND OF THE INVENTION

The present invention relates to an image projector and, in particular, it concerns an image projector based on a reflective spatial light modulator (SLM).

Many display systems, particularly near-eye displays, employ an image projector which outputs a collimated image into a light-guide optical element (LOE) which conveys the image in front of the user's eye, where it is coupled-out towards the eye for viewing.

Image projectors typically include an image generating element and collimating optics in order to generate a collimated image output. One desirable option for image generator is a reflective spatial light modulator (SLM), commonly implemented as a liquid-crystal on silicon (LCOS) chip, which is illuminated with polarized illumination and reflects illumination with selectively rotated polarization corresponding to the image pixel intensities. The image is then selected by a polarizing beam splitter (PBS) before reaching collimating optics.

SUMMARY OF THE INVENTION

The present invention is an image projector based on a reflective SLM and having an intermediate image plane.

According to the teachings of an embodiment of the present invention there is provided, an image projector for outputting a collimated image, the image projector comprising: (a) an illumination source; (b) a spatial light modulator illuminated by light from the illumination source so as to reflect light corresponding to an image; (c) a first optical arrangement with positive optical power deployed to focus light reflected from the spatial light modulator at an image plane; and (d) a second optical arrangement with positive optical power deployed to collimate light from the image plane as a collimated output image.

According to a further feature of an embodiment of the present invention, at least the second optical arrangement comprises a reflective lens associated with a surface of a prism containing a polarizing beam splitter.

According to a further feature of an embodiment of the present invention, the prism is optically integrated with a light-guide optical element (LOE) having a pair of parallel major external surfaces for guiding light by internal reflection, wherein a part of the prism between the polarizing beam splitter and the LOE has an external surface which is coplanar with, and forms and extension of, one of the major external surfaces of the LOE.

According to a further feature of an embodiment of the present invention, a light path from the spatial light modulator via the first and second optical arrangements to an image output passes through two polarizing beam splitters, and wherein the image plane is located between the two polarizing beam splitters.

According to a further feature of an embodiment of the present invention, the two polarizing beam splitters are parallel.

According to a further feature of an embodiment of the present invention, the two polarizing beam splitters are included within a prism, and wherein the first and second optical arrangements are implemented as reflective lenses associated with surfaces of the prism.

According to a further feature of an embodiment of the present invention, there is also provided at least one optical element spatially associated with the image plane.

According to a further feature of an embodiment of the present invention, the at least one optical element comprises a field lens.

According to a further feature of an embodiment of the present invention, the at least one optical element comprises a diffuser.

According to a further feature of an embodiment of the present invention, the at least one optical element comprises a micro-lens array.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is an image projector for outputting a collimated image.

The principles and operation of image projectors according to the present invention may be better understood with reference to the drawings and the accompanying description.

Figure 1A:
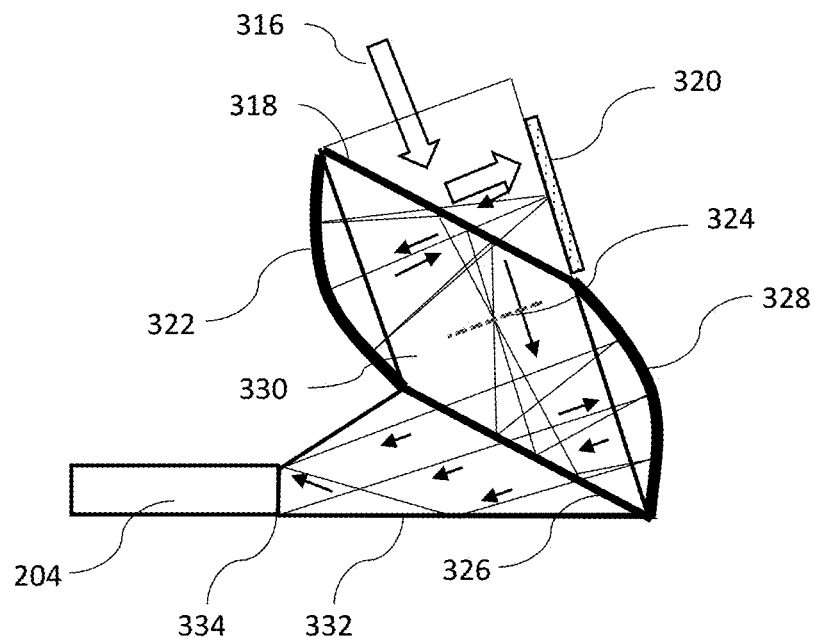
FIG. 1A is a schematic side view of an image projector, constructed and operative according to the teachings of an embodiment of the present invention.

Referring now to the drawings, FIG. 1A illustrates a non-limiting implementation of an image projector, constructed and operative according to the teachings of embodiments of the present invention, for outputting a collimated image. In general terms, the image projector includes a spatial light modulator (SLM) 320 illuminated by light from an illumination source, represented schematically by arrow 316, so as to reflect light corresponding to an image. A first optical arrangement 322 with positive optical power is deployed to focus light reflected from SLM 320 at an image plane 324. A second optical arrangement 328 with positive optical power is deployed to collimate light from image plane 324 as a collimated output image.

The focusing of light from a reflective SLM at an intermediate image plane 324 within the image projector assembly provides significant advantages compared to an arrangement where the SLM itself must be at the focal plane of the collimating optics. Specifically, in order to achieve a large angular field of view (FOV) of the projected image with a relatively small projector, the focal length of the collimating optics should be relatively short. However, a reflective SLM requires an illumination system for front illumination of the SLM. This limits how close the SLM can be positioned to the collimating optics, typically leading to increased size of the collimating optics, a reduction of FOV, and/or other design compromises. By providing a first optical arrangement 322 to generate an image at an image plane 324 within the projector, these design limitations are released, leaving ample room for an illumination system while allowing use of collimating optics with a short focal length. This and other advantages of the present invention will become clearer from the description below and the accompanying drawings.

In certain particularly preferred implementations, at least the second optical arrangement 328 is implemented as a reflective lens associated with a surface of a prism 330 containing a polarizing beam splitter 326. Advantageously, the image plane 324 may fall at some plane within prism 330, without requiring any particular structure to be present at that plane. Alternatively, in certain implementations, it may be desirable to deploy one or more optical element at or near the focal plane, as will be exemplified below with reference to FIG. 1B.

In certain applications, the image projector is integrated with a light-guide optical element (LOE) 204, which is typically a slab-type waveguide with two parallel major external surfaces within which the image illumination propagates by total internal reflection (TIR). In certain preferred implementations, a part of prism 330 between polarizing beam splitter 326 and LOE 204 has an external surface 332 which is coplanar with, and forms an extension of, one of the major external surfaces of LOE 204. This facilitates filling of the optical aperture 334 into LOE 204 by generating the reflected (conjugate) image at the LOE entrance. LOE 204 may be any type of LOE known in the art, such as for example, an LOE employing sets of partially-reflecting internal surfaces to achieve aperture expansion in one or two dimensions and coupling out the image illumination towards the eye of an observer. Alternatively, or additionally, the LOE may employ diffractive optical elements to achieve one or two dimensions of optical aperture expansion and to couple out the image illumination towards the eye of an observer, all as is known in the art.

In the preferred but non-limiting example illustrated in FIG. 1A, a light path from SLM 320 via first and second optical arrangements 322, 328 to an image output 334 passes through two polarizing beam splitters 318 and 326, and image plane 324 is located between the two polarizing beam splitters. Advantageously, the two polarizing beam splitters 318 and 326 are parallel. This helps to minimize noise in the output image, since any raw illumination from illumination source 316 which leaks through PBS 316, due, for example, to a skew-angle of incidence which is not fully filtered, will encounter exactly the same conditions at the second PBS 326, and will therefore also pass through PBS 326 without becoming mixed with the image illumination.

The image projector of the present invention provides considerable design freedom with regard to the position of the intermediate image plane, the power of the collimating optics and the overall size of the optics. If the intermediate image plane 324 is designed to be closer to the collimating optics 328, the size of the optics can be reduced and/or the FOV increased, subject to limitations of optical aberrations and the required size of the intermediate image compared to the SLM chip size. The first optical arrangement 322 is then designed according to the required position of the intermediate image and its size relative to the SLM chip size.

In the implementation illustrated here, the two polarizing beam splitters 318 and 326 are included within prism 330, and first and second optical arrangements 322 and 328 are both implemented as reflective lenses associated with surfaces of the prism. Each lens is integrated with a quarter wave plate which, after the double-pass generated by the reflection, achieves rotation of the polarization, thereby achieving transmission-followed-by-reflection or reflection-followed-by-transmission at the corresponding PBS surfaces, as is known in the art.

Illumination source 316 may be any suitable illumination source known in the art, including but not limited to LEDs and laser diodes. The illumination source may include sources of different colors which can be switched rapidly in order to illuminate color separation images within a single frame period of a video in order to generate color images. The illumination source may include various optical components for directing and/or homogenizing the illumination, all as is known in the art.

The SLM 320 may be any suitable type of SLM, and particularly, a front-lit SLM. One particularly preferred example of an SLM suitable for implementing the present invention is an LCOS (liquid-crystal on silicon) chip. The SLM is typically a rectangular array extending also into the page in the side view shown here, and all of the other optical components illustrate here similarly extend into the page according to relative dimensions dictated by the aspect ratio of the SLM, as will be clear to a person ordinarily skilled in the art.

It will be noted that the light paths illustrated here are for light from a center pixel of the SLM 320 illuminated by light from illumination source 316 that has reflected from PBS 318. The diverging light reflected from the SLM passes through PBS 318 and is focused by reflecting lens 322. The converging light is again reflected by PBS 318 to generate an image at image plane 324. The diverging light from this plane is reflected by second PBS 326 onto collimating reflecting lens 328. The reflected collimated light is coupled into the waveguide while some of it is reflected by bottom plane 332.

Figure 1B:
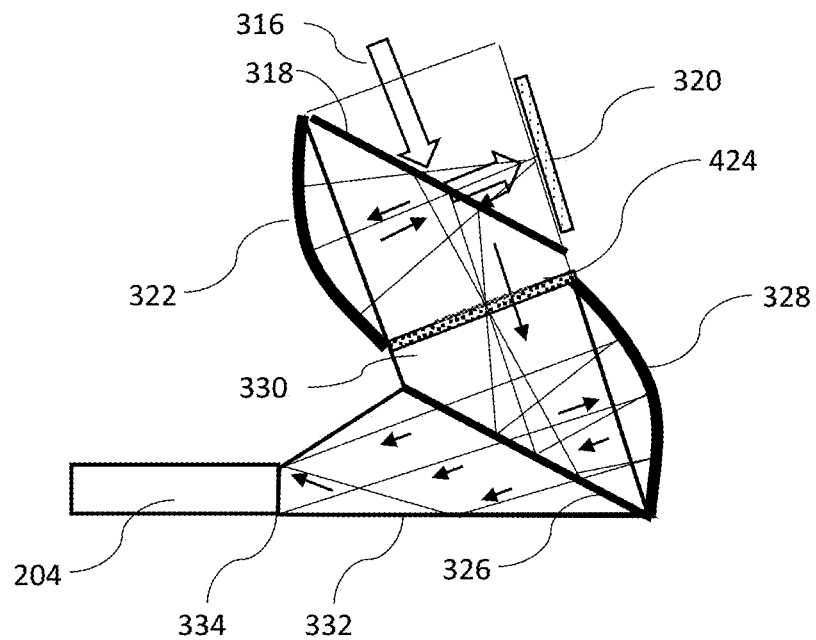
FIG. 1B is a view similar to FIG. 1A illustrating a variant implementation of the image projector including an optical element at an image plane of the projector.

FIG. 1B illustrates an image projector generally equivalent to that of FIG. 1A, but in which at least one optical element 424 is deployed at or near (i.e., spatially associate with) the image plane 324. Optical element 424 may be a lens, typically a Fresnel lens, deployed to at least partially correct a field curvature of the optical arrangements. Additionally, or alternatively, optical element 424 may include a diffuser or a micro-lens array (MLA) that serves to adjust spreading of the illumination so as to generate a more uniform output intensity across the optical aperture of the image projector output. In all other respects, the image projector of FIG. 1B is equivalent in structure and function to that of FIG. 1A, described above.

Figure 2:
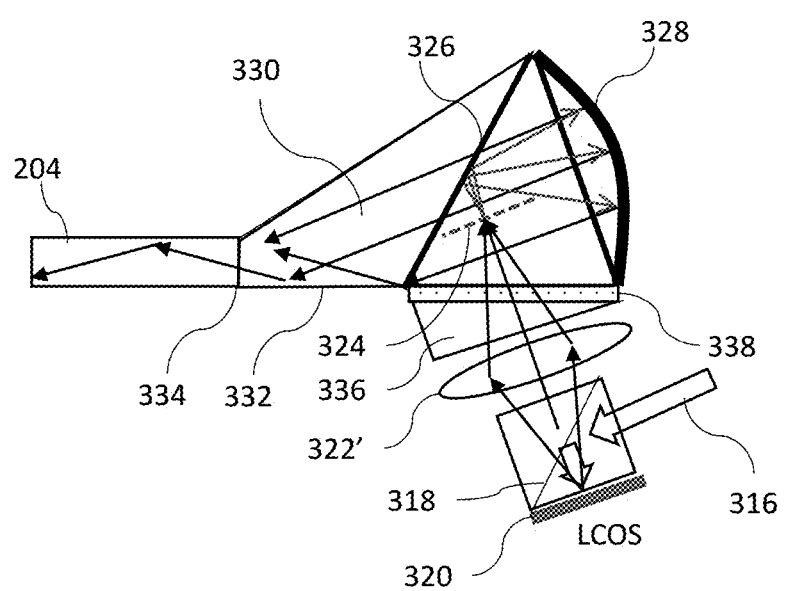
FIG. 2 is a schematic side view of an image projector, constructed and operative according to the teachings of a further embodiment of the present invention.

Turning now to FIG. 2, this illustrates a second implementation of the present invention which is functionally similar to that of FIG. 1, but which employs free-space optics to generate the internal image plane.

Specifically, in this case, the SLM 320, illuminated by an illumination source 316 via a PBS 318, is aligned with a first optical arrangement 322', here implemented as a free-space optical arrangement, typically employing one or more refractive lens, deployed to focus light reflected from SLM 320 at an image plane 324. A second optical arrangement 328 with positive optical power is deployed to collimate light from image plane 324 as a collimated output image, shown here entering LOE 204 at entrance aperture 334. Second optical arrangement 328 is implemented here as a reflective lens associated with a surface of a PBS prism 330 including PBS 326 to direct the light from image plane 324 towards the collimating optics. The reflected collimated light (after passing twice through a quarter-wave plate, as mentioned above) passes through PBS 326 to reach aperture 334, part directly and part after an additional reflection at prism surface 332.

A coupling-in prism 336 is provided in order to facilitate coupling-in of the image illumination after first optical arrangement 322'. An airspace or a buffer layer of low refractive index material 338 is provided in order to maintain TIR conditions for the collimated light propagating from collimating optics 328 to the exit/entrance aperture 334.

It will be appreciated that the above descriptions are intended only to serve as examples, and that many other embodiments are possible within the scope of the present invention as defined in the appended claims.

What is claimed is:

1. An image projector for outputting a collimated image, the image projector comprising:
   (a) an illumination source;
   (b) a spatial light modulator illuminated by light from said illumination source so as to reflect light corresponding to an image;
   (c) a first optical arrangement with positive optical power deployed to focus light reflected from said spatial light modulator at an image plane; and
   (d) a second optical arrangement with positive optical power deployed to collimate light from said image plane as a collimated output image, wherein a light path from said spatial light modulator via said first and second optical arrangements to an image output passes through two polarizing beam splitters, and wherein said image plane is located between said two polarizing beam splitters, and wherein at least said second optical arrangement comprises a reflective lens associated with a surface of a prism containing one of said polarizing beam splitters.

2. The image projector of claim 1, wherein said prism is optically integrated with a light-guide optical element (LOE) having a pair of parallel major external surfaces for guiding light by internal reflection, wherein a part of said prism between said polarizing beam splitter and said LOE has an external surface which is coplanar with, and forms and extension of, one of said major external surfaces of said LOE.

3. The image projector of claim 1, wherein said two polarizing beam splitters are parallel.

4. The image projector of claim 1, wherein both of said two polarizing beam splitters are included within said prism, and wherein said first and second optical arrangements are both implemented as reflective lenses associated with surfaces of said prism.

5. The image projector of claim 1, further comprising at least one optical element spatially associated with said image plane.

6. The image projector of claim 5, wherein said at least one optical element comprises a field lens.

7. The image projector of claim 5, wherein said at least one optical element comprises a diffuser.

8. The image projector of claim 5, wherein said at least one optical element comprises a micro-lens array.

* * * * *